(12) United States Patent
Billman et al.

(10) Patent No.: US 11,844,456 B1
(45) Date of Patent: Dec. 19, 2023

(54) FORMED PRODUCT GRILL

(71) Applicant: Omar Associates, LLC, Omar, OH (US)

(72) Inventors: Chad W. Billman, Sandusky, OH (US); Eric J. Wise, Monroeville, OH (US)

(73) Assignee: Omar Associates, LLC, Omar, OH (US)

( * ) Notice: Subject to any disclaimer, the term of this patent is extended or adjusted under 35 U.S.C. 154(b) by 229 days.

(21) Appl. No.: 17/154,052

(22) Filed: Jan. 21, 2021

Related U.S. Application Data

(63) Continuation-in-part of application No. 17/067,702, filed on Oct. 11, 2020, now abandoned.

(60) Provisional application No. 62/914,185, filed on Oct. 11, 2019.

(51) Int. Cl.
| | |
|---|---|
| *A23P 30/10* | (2016.01) |
| *A47J 29/02* | (2006.01) |
| *B65G 21/20* | (2006.01) |
| *B65G 47/57* | (2006.01) |
| *B65G 17/06* | (2006.01) |
| *B65G 45/24* | (2006.01) |
| *A47J 43/20* | (2006.01) |
| *A23L 15/00* | (2016.01) |
| *B65G 39/07* | (2006.01) |

(52) U.S. Cl.
CPC .......... *A47J 29/02* (2013.01); *A23L 15/00* (2016.08); *A23P 30/10* (2016.08); *A47J 43/20* (2013.01); *B65G 17/063* (2013.01); *B65G 21/2054* (2013.01); *B65G 39/07* (2013.01); *B65G 45/24* (2013.01); *B65G 47/57* (2013.01); *B65G 2201/0208* (2013.01)

(58) Field of Classification Search
CPC . A47J 29/02; A47J 43/20; A23L 15/00; A23L 5/10; A23L 5/15; A23P 30/10; A23B 5/0055; A23B 5/01; B29C 33/34–33/36; B29C 33/72; B65G 17/063; B65G 21/2054; B65G 39/07; B65G 45/24; B65G 47/57; B65G 2201/0208
See application file for complete search history.

(56) References Cited

U.S. PATENT DOCUMENTS

| | | | | |
|---|---|---|---|---|
| 2,497,280 | A * | 2/1950 | Stier | A47J 29/00 D7/672 |
| 3,152,537 | A * | 10/1964 | Dietz | A47J 37/1214 198/701 |
| 3,736,860 | A * | 6/1973 | Vischer, Jr. | F24C 7/087 99/477 |
| 3,782,269 | A * | 1/1974 | Latham | A47J 37/044 99/427 |

(Continued)

*Primary Examiner* — Drew E Becker
(74) *Attorney, Agent, or Firm* — Rankin, Hill & Clark LLP

(57) ABSTRACT

A conveyor system includes an upper and lower synchronized conveyors that transfer a food product, such as eggs, through a heating system to cook the food product. The lower conveyor includes a belt and the upper conveyor includes rings that are moveably held within frames. The rings and belt are brought together to define receptacles in which the food product is arranged during cooking. After cooking, the rings are lifted off of the belt, leaving the food product on the belt. A transfer roller transfers the cooked food product from the belt for further processing, such as freezing of the food product.

14 Claims, 8 Drawing Sheets

(56) References Cited

U.S. PATENT DOCUMENTS

| | | | | |
|---|---|---|---|---|
| 3,869,973 | A * | 3/1975 | Quitman | A47J 37/0611 99/426 |
| 4,280,402 | A * | 7/1981 | Featherstone | A21B 1/48 99/423 |
| 4,297,942 | A * | 11/1981 | Benson | A47J 37/044 99/388 |
| 4,448,793 | A * | 5/1984 | Akesson | A22C 11/001 99/441 |
| 4,479,776 | A * | 10/1984 | Smith | A23L 3/185 219/400 |
| 4,488,479 | A * | 12/1984 | Sloan | A47J 29/00 D7/357 |
| 4,512,250 | A * | 4/1985 | Schindler | A47J 37/067 99/425 |
| 4,582,047 | A * | 4/1986 | Williams | A47J 37/044 126/369 |
| 5,088,391 | A * | 2/1992 | Anderson | A23L 5/15 99/450.2 |
| 5,137,745 | A * | 8/1992 | Zukerman | A23P 20/20 426/512 |
| 5,511,467 | A * | 4/1996 | Motley | A47J 27/06 220/756 |
| 5,692,431 | A * | 12/1997 | Herring | A21B 3/134 99/426 |
| 6,012,293 | A * | 1/2000 | Andersson | A23G 3/0273 62/345 |
| 6,065,393 | A * | 5/2000 | Lombard | A47J 37/108 99/426 |
| 6,865,983 | B2 * | 3/2005 | McNamee | A21B 5/08 99/330 |
| 8,037,813 | B2 * | 10/2011 | Suttle | A23G 1/206 426/660 |
| 10,765,133 | B1 * | 9/2020 | Sandor | A23L 13/20 |
| 11,678,674 | B1 * | 6/2023 | Taylor | A23P 30/10 425/574 |
| 2002/0044996 | A1 * | 4/2002 | McNeel | A23L 7/13 426/549 |
| 2005/0136172 | A1 * | 6/2005 | Hairsine | A23J 1/09 426/614 |
| 2006/0210672 | A1 * | 9/2006 | Suttle | A23G 1/0069 426/89 |
| 2008/0063777 | A1 * | 3/2008 | Roberts | A23L 15/00 426/558 |
| 2009/0120107 | A1 * | 5/2009 | Oztas | A23L 3/36 62/340 |
| 2009/0255413 | A1 * | 10/2009 | Ewald | A47J 43/20 99/426 |
| 2012/0280106 | A1 * | 11/2012 | Mills | A21D 13/44 264/161 |
| 2014/0072688 | A1 * | 3/2014 | Strand | A23L 3/375 426/531 |
| 2016/0135641 | A1 * | 5/2016 | Vega | A47J 36/16 99/422 |
| 2020/0196646 | A1 * | 6/2020 | Gildersleeve, III | A23B 5/041 |
| 2020/0260738 | A1 * | 8/2020 | Sangiacomo | B65G 23/06 |

* cited by examiner

US 11,844,456 B1

FORMED PRODUCT GRILL

CROSS REFERENCE TO RELATED APPLICATION

This application is a continuation-in-part of co-pending U.S. application Ser. No. 17/067,702, filed Oct. 11, 2020, and claims priority to U.S. Provisional App. Ser. No. 62/914,185, filed Oct. 11, 2019, both of which are expressly incorporated by reference.

BACKGROUND OF INVENTION

Field of Invention

The present invention relates to a conveyor system for heating a food product. More particularly, the present invention relates to a formed product grill, e.g. a grill for cooking egg-based food products, which are formed and cooked to a ready-to-eat condition.

Brief Description of Related Art

Food product belt grills are known, which use two polytetrafluoroethylene ("PTFE", e.g. Teflon®) conveyor belts, one below the food product, and one above, to pinch the food product while being transferred through the grill. Heating platens are located below the bottom belt and above the top belt to transfer heat through the belts by conduction to the food product. The platens are heated by thermal fluid supplied by an outside heating and pumping system. The temperature of the grill is managed by regulating flow and temperature of thermal fluid supplied to the heating platens.

Sunny side up eggs require delicate cooking and handling in order to be cooked to a ready-to-eat condition, frozen, and then packaged for use in restaurants, sandwich assembly, and other applications. All-natural eggs require slow, uniform cooking and specialized guidance during the cooking process to result in a clear, bright egg white and a liquid yolk. To date, mass production of this cooked food product has not been attempted by the industrial food processing industry.

BRIEF SUMMARY OF THE INVENTION

In one aspect, a ring assembly includes a frame and rings. The frame includes bars. The bars include two spaced-apart lateral bars connected by a series of spaced-apart longitudinal bars. The bars define square openings. The rings are moveably held within the openings. Each of the rings defining an open top and an open bottom.

In another aspect, a conveyor system for heating a food product includes a feed end and an opposite discharge end, a belt, a frame, a plurality of molds, and a heating system. The belt is configured to be moved in a first direction from the feed end toward the discharge end. Each of the molds includes an open bottom. The frame defines openings, each of which moveably hold one of the molds. The frame is configured to move in the first direction and toward the belt such that the open bottom of each of the molds contacts the belt so as to define a receptacle between each of the molds and the belt. The receptacle is configured to contain the food product during heating of the food product and to provide a shape to the heated food product. The heating system is configured to heat the food product in the receptacle.

In another aspect, a method of preparing a cooked food product includes providing a conveyor system including a belt, a frame, molds, and a heating system. Each of the molds is moveably held within an opening in the frame and includes an open bottom. The method includes moving the frame such that the open bottom of each of the molds contacts the belt to thereby form a plurality of receptacles. The food product is arranged in the receptacles and is cooked in the receptacles by heat provided from the heating system. The frame is then moved such that the molds do not contact the belt, thereby leaving the cooked food product on the belt.

DETAILED DESCRIPTION OF THE INVENTION

Figure 1:
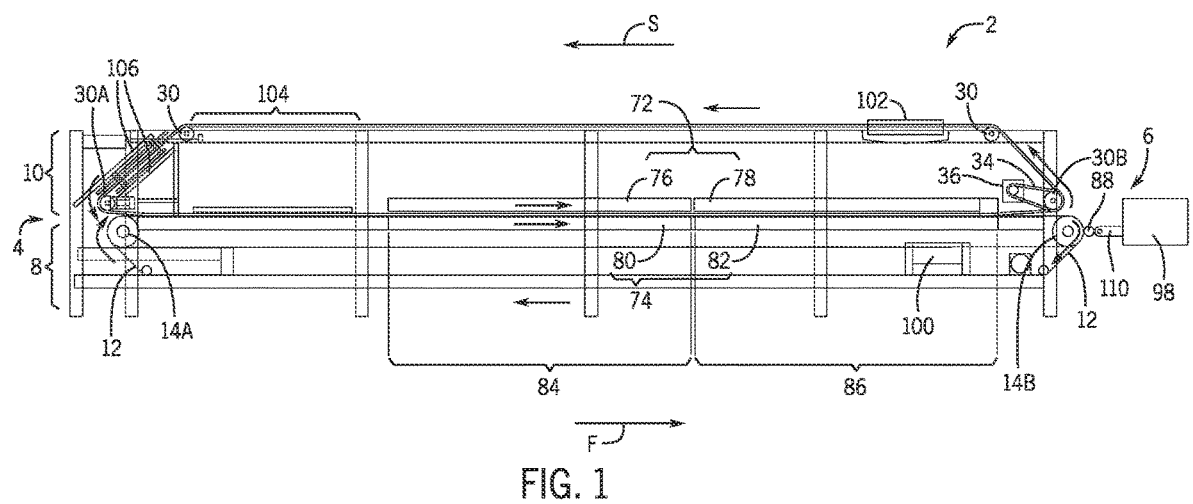
FIG. 1 is a schematic side view of a conveyor system in accordance with the present subject matter.

The present subject matter relates to a conveyor system 2 (also referred to herein as "conveyor assembly") having a feed end 4 and an opposite discharge end 6. The conveyor system 2 includes a lower conveyor 8 and an upper conveyor 10 and is configured to heat a food product 70, for example an egg-based food product. The conveyor system 2 may continuously operate to prepare sunny side up eggs. The cooked eggs may be frozen and packaged for later consumption. Operation of the conveyor system 2 will be discussed with respect to cooking eggs as the food product 70, but this is not required, and it should be appreciated that other food products can be cooked using the conveyor system 2.

1. Lower Conveyor.

The lower conveyor 8 includes a belt 12 that rotates around a first curved path (indicated by the lower set of arrows in FIG. 1) between the feed end 4 and the discharge end 6. The belt 12 may be guided by rollers 14 along the first curved path. The rollers 14 may include a large diameter feed end roller 14A that is also used to tension the belt 12, and a large diameter discharge end roller 14B that also serves to drive the belt 12 by friction along the first curved path. Friction between the discharge end roller 14B and the belt 12 is increased by the tension applied by the feed end roller 14A. The belt 12 may be non-stick, and may include a 0.012" thick, flat, PTFE conveyor belt. Other materials, such as silicon, may be used to form or coat the belt 12. The belt 12 is flat, and is joined together at the ends using an arrow finger style splice to make an endless/continuous loop. The arrow finger splice creates a flat surface at the joint to enable the molds 20 to sit flat across the splice joint.

2. Upper Conveyor.

The upper conveyor 10 includes a ring assembly including one or more frames 16, each of which define openings 18, and a plurality of molds 20 (also referred to herein as "rings"). The molds 20 are operatively connected with the frame 16 in that each one of the molds 20 is movably held (i.e. trapped) within one of the openings 18. As such, movement of the frame 16 along a second curved path (indicated by the upper set of arrows in FIG. 1) between the feed end 4 and the discharge end 6 also causes the molds 20 to move along the second curved path.

Figure 2:
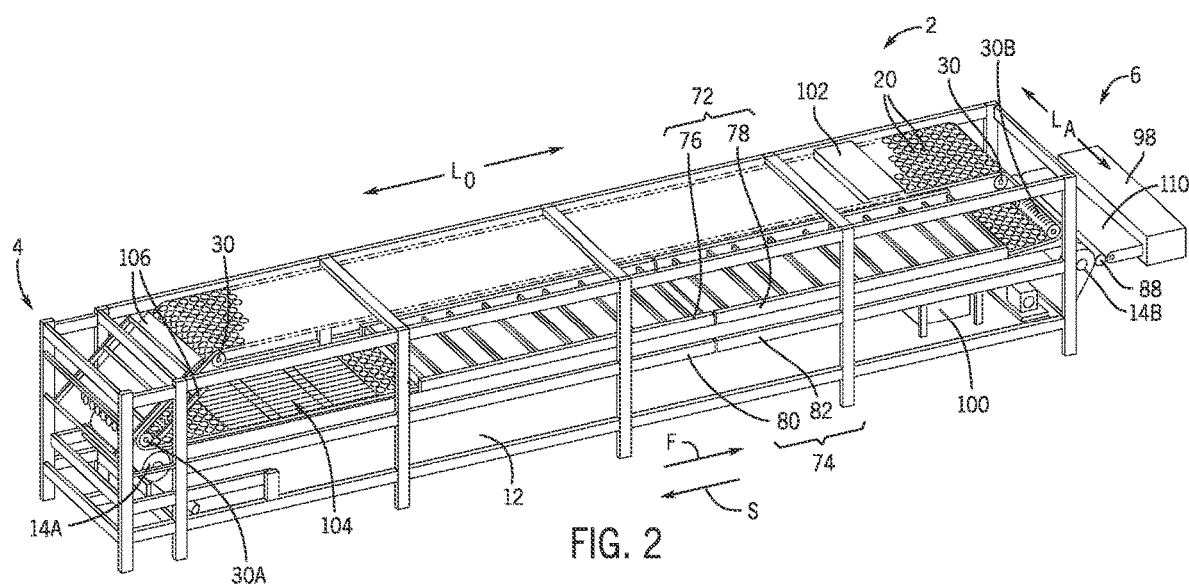
FIG. 2 is a schematic perspective view of the conveyor system in accordance with the present subject matter.

The frames 16 each include a network of bars 22 connected together to define the openings 18. Two lateral bars 22A of each frame 16 extend in a lateral direction $L_A$ (see FIG. 2) of the conveyor system 2 across a width of the conveyor system 2, and spaced-apart longitudinal bars 22B extend in a longitudinal direction $L_O$ (see FIG. 2) of the conveyor system 2 along a length of the conveyor system 2. The two lateral bars 22A of each frame 16 are spaced apart and may be parallel to each other, and are connected by a series of the longitudinal bars 22B, which are spaced apart and may be parallel to each other, to thereby form the openings 18. The lateral bars 22A are longer than the longitudinal bars 22B, and both the lateral bars 22A and longitudinal bars 22B can be fabricated from round stock or stock having another cross-section shape.

The openings 18 are shown to each have a square or rectangular shape, however this is not required and the openings 18 can have other shapes. The length of the lateral bars 22A, the length and number of longitudinal bars 22B, and the number and size of the openings 18 on each frame 16 are not critical and can be varied for a particular application as desired. The frames 16 may form a regular grid pattern of openings 18.

Figure 3:
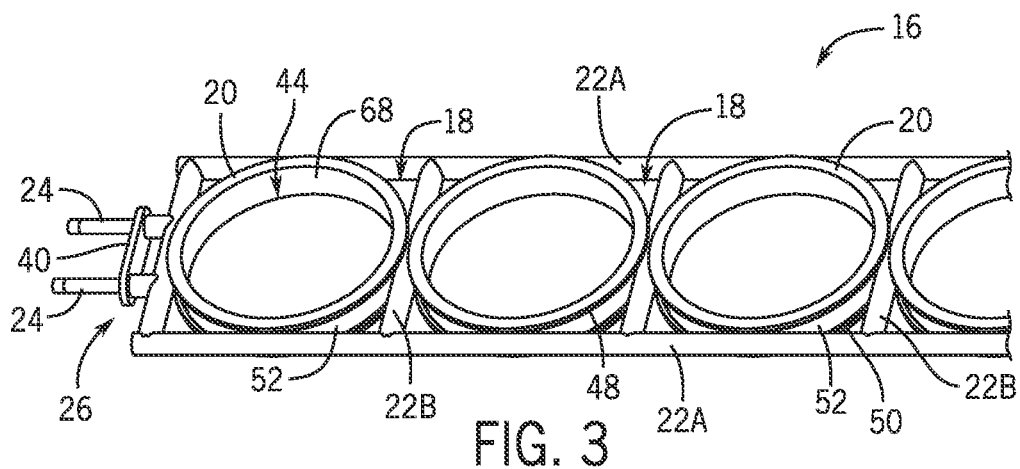
FIG. 3 is a perspective view of a portion of ring assembly in accordance with the present subject matter.
Figure 4:
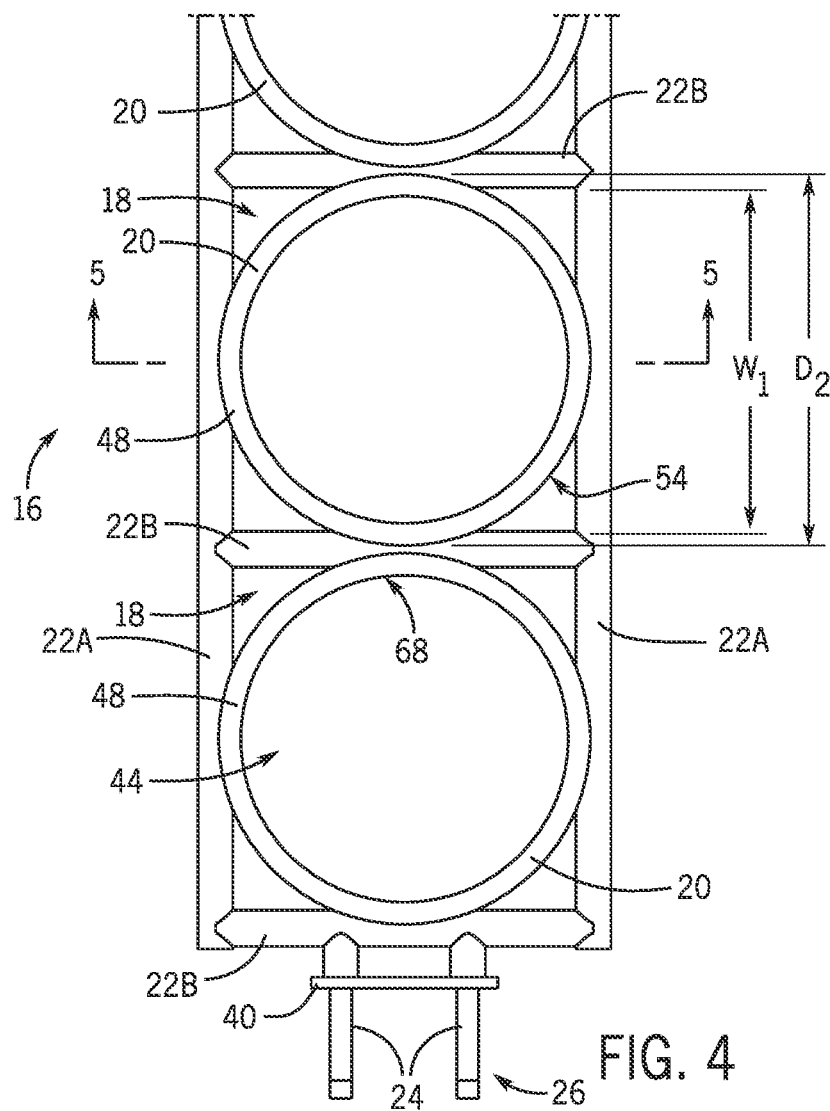
FIG. 4 is a top view of the portion of the ring assembly of FIG. 3.

The frames 16 each include four pins 24, two of which extend from each lateral end 26 of the frame 16 (one lateral end 26 shown in FIGS. 3 and 4). The two pins 24 on each lateral end 26 extend from a terminal lateral longitudinal bar 22B. The four pins 24 on each frame 16 act to operatively connect each frame 16 to two endless/continuous drive chains 28, one of the chains 28 arranged on each lateral end 26 of the frames 16. The drive chains 28 are parallel to each other and are driven around the second curved path between the feed end 4 and the discharge end 6, which causes the frames 16 and molds 20 to also move around the second curved path. The drive chains 28 may be roller chains and can be guided/deflected along the second curved path by rollers 30 and guides 32, and driven by a discharge end drive roller 30B, which is turned by a second drive chain 34 that is driven by a drive motor 36. The two pins 24 on each lateral end 26 of the frame 16 may act as link pins of a link 38 of the drive chains 28. The frames 16 may also include a plate 40, which similar to the pins 24, acts a plate of a link 38 of the drive chains 28. The conveyor system 2 may use a band or belt, instead of the drive chains 28, to drive the frames 16 around the second curved path.

The molds 20 each include an endless round vertical side wall 42 defining an open top 44 and an open bottom 46. The molds 20 each include a top flange 48 and a bottom flange 50 that extend horizontally out from the side wall 42 to thereby define an annular groove 52 between them and at the outside 54 of the side wall 42. The top flange 48 may extend out at the top edge 56 of the side wall 42, and the bottom flange 50 may extend out at a bottom edge 58 of the side wall 42.

Figure 5:
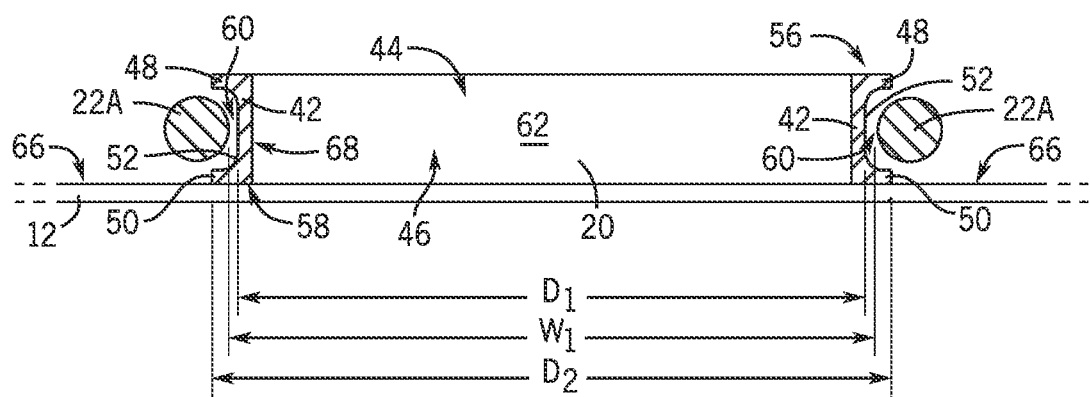
FIG. 5 is a cross-section view taken along arrows 5-5 from FIG. 4.
Figure 6:
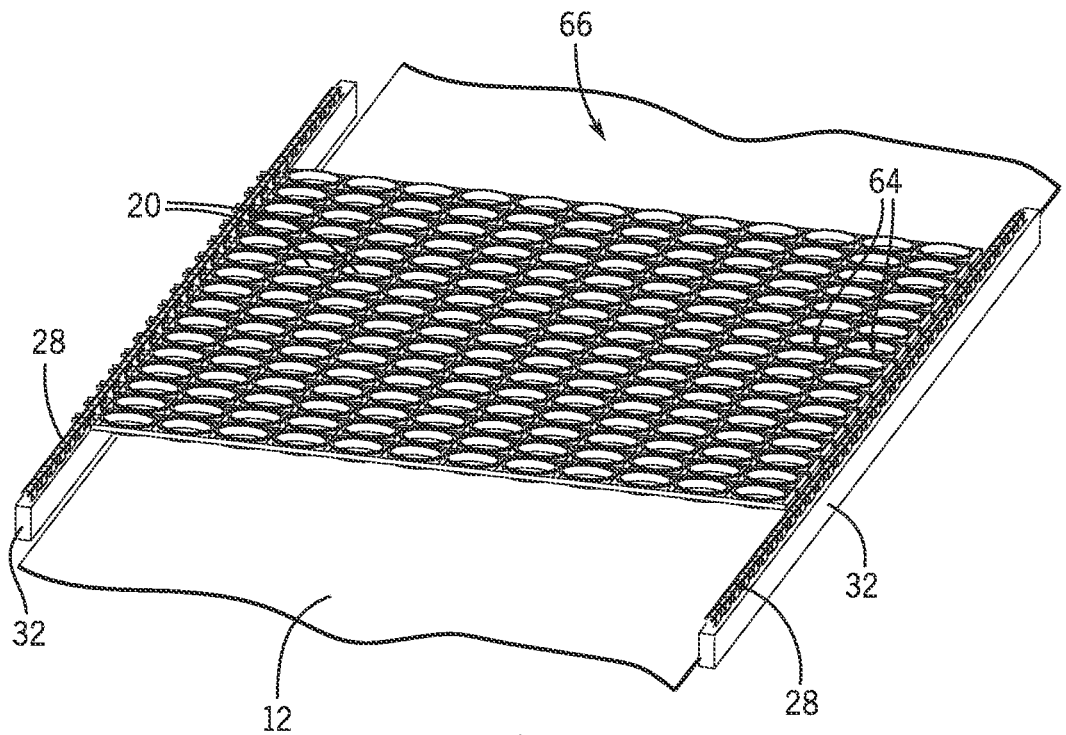
FIG. 6 is a perspective view showing a loading section of a conveyor system accordance with the present subject matter.

Each of the openings 18 between the two lateral bars 22A and two adjacent longitudinal bars 22B movably hold one of the molds 20, which configuration is accomplished by some of the bars 22 being arranged at least partially within the groove 52 of the mold 20. In particular, as shown in FIG. 5, a width $W_1$ of the opening 18 (i.e. a distance between the lateral bars 22A) is larger than a diameter $D_1$ of the groove 52 but smaller than a diameter $D_2$ of the flanges 48, 50 so as to provide a gap 60 between the mold 20 and the lateral bars 22A. The gap 60 may be 1/4" to 1/16", or 1/8", i.e. the width W1 may be 1/4" to 1/16", or 1/8" larger than the diameter D1. The diameter D2 may be 1/16" larger than the width W1. As such, the molds 20 are prevented from escaping from the openings 18 in the frame 16 because the two lateral bars 22A are arranged at least partially within the groove 52 of the mold 20 and are prevented from escaping the groove 52 due to the flanges 48, 50. In a similar manner, the longitudinal bars 22B may also be arranged at least partially within the groove 52 of the mold 20 in the same manner as the lateral bars 22A shown in FIG. 5, such that four of the bars 22 (two lateral bars 22A and two of the longitudinal bars 22B) are arranged at least partially within the groove 52.

The molds 20 and the frame 16 may be made from stainless steel, and one or both can be coated with silicone or PTFE (e.g. Teflon®) to improve food product release characteristics. The molds 20 may be made or coated with other material, including for example, silicone, which may be molded to form the molds 20. The molds 20 may be machined, molded, or otherwise formed into a ring shape, having a smooth inner surface 68, e.g. that can be polished (e.g. electro-polished), in order to inhibit food product 70 from sticking thereto.

The molds 20 being loosely (i.e. movably) held by the frame 16 within the openings 18 allows for a certain amount of "play" between the molds 20 and the frame 16, i.e. a certain amount or degree of movement is provided between the molds 20 relative to the frame 16 and openings 18. More specifically, the molds 20 may move vertically and horizontally with respect to the frame 16 and openings 18 to an extent allowed by the gap 60 between the molds 20 and the bars 22, yet at the same time be operatively connected to the frame 16 because the molds 20 cannot escape from the openings 18 because such escape is prevented by the flanges 48, 50 being larger than the openings 18.

Figure 7:
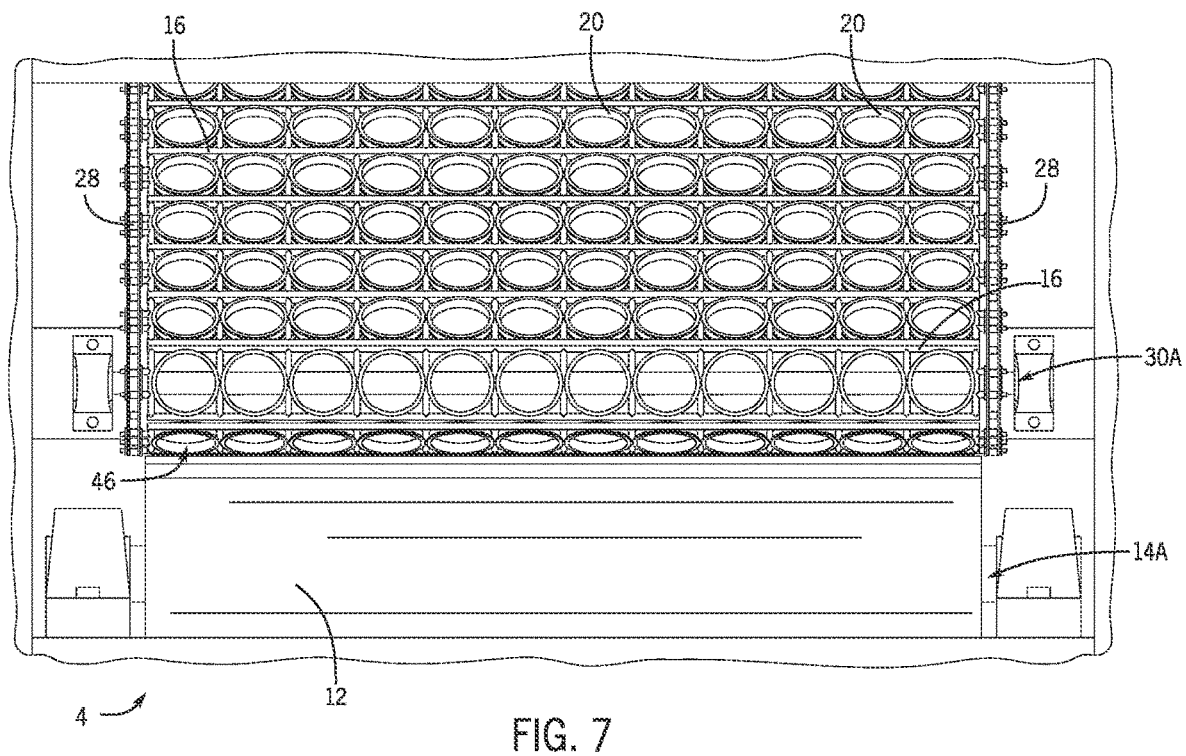
FIG. 7 is a back view showing a feed end of a conveyor system in accordance with the present subject matter.

The conveyor system 2 is configured such that the lower conveyor 8 and the upper conveyor 10 are brought together at the feed end 4 (FIG. 7) such that the molds 20 of the upper conveyor 10 contact the belt 12 of the lower conveyor 8 so as to define a receptacle 64 between each of the molds 20 and the belt 12. The receptacles 64 are moved in a feed path in the first direction F by the lower conveyor 8 and the upper conveyor 10 being moved together along a first direction F toward the discharge end 6 and through a heating system of the conveyor system 2. The movement of the lower conveyor 8 and the upper conveyor 10 may be synchronized so that the belt 12 and the molds 20 move at the same speed in the first direction F. When the lower conveyor 8 and the upper conveyor 10 are brought together, the play between the molds 20 and the frame 16 allow the molds 20 to lay flat on the upper surface 66 of the belt 12, even if the upper surface 66 is not completely parallel with the frame 16 or even if the frame 16 is suspended above the belt 12 by a certain distance. This amount of play between the molds 20 and the frames 16 thus allows the molds 20 to lay firmly against the upper surface 66 of the belt 12 and ensures a seal is formed between the bottom surface of the molds 20 and the upper surface 66 of the belt 12. This seals off the interior of the receptacles 64 to prevent escape of the food product 70 therefrom.

The receptacles 64 are defined by the upper surface 66 of the belt 12 and the inner surface 68 of the molds 20, and are configured to contain a food product 70 (e.g. a raw egg) while the food product 70 is moved in the first direction F and heated (e.g. cooked) by the heating system. The belt 12 may be tracked when moved in the first direction F to be within 1/8" of center to prevent liquid food product 70 from leaking under the molds 20 prior to solidification during heating (cooking). Tracking of the belt 12 is controlled by a three-roller system that steers the belt 12 by increasing or decreasing tension mid-width of the belt material as it is conveyed through the first curved path. The belt 12 is flat and straight to maintain control of the shape of the cooking food product 70 held in the molds 20.

The open bottoms 46 of the molds 20 allow the food product 70 to contact the upper surface 66 of the belt 12. The food product 70, e.g. a raw egg, may also spread out in the receptacles 64 and contact the inner surface 68 of the molds 20, which may provide a shape to the food product 70 as it is cooked. The shape of the cooked food product 70 may therefore be based on the internal shape of the receptacles 64. In other words, the molds 20 and the corresponding receptacles 64 defined by the molds 20, form the food product 70 to have a particular shape when it is cooked. Sunny side up eggs require a structure during cooking in order create a round finished (cooked and ready to eat) product. In the case of the molds 20 being in the shape of a ring, the cooked eggs may have a round outer horizontal edge. The molds 20 may have a different internal shape to provide other formed shapes for the cooked eggs as desired.

3. Heating System.

The heating system is configured to heat the food product 70 from above and/or from below the food product 70 as the food product 70 in the receptacles 64 through the feed path in the first direction F. The molds 20 may also be heated by the heating system. The heating system may heat the food product 70 by any one or more of radiation, conduction, convection.

The heating system may include a thermal radiation unit 72 arranged above the food product 70, and a thermal conduction unit 74 arranged below the food product 70. The thermal radiation unit 72 may be stainless steel and include a first radiant heater 76 and a second radiant heater 78. The first and second radiant heaters 76, 78 may be assembled in a manner that creates a gap between two parallel stainless steel plates with a flow path between the two plates. The flow path begins at one corner of the heaters 76, 78, follows along one side of the heaters 76, 78, then turns 180° to flow in the opposite direction, but parallel to the first path. This is continued until the fluid reaches the corner diagonally opposite to the corner of entry. The flow path is sized to produce the required radiant energy (heat) to cook the product traveling below the heaters 76, 78. The thermal radiation unit 72 may be mounted on mechanical screw jacks to adjust a distance between the thermal radiation unit 72 and the food product 70. This adjustment allows more or less intense heating of the top of the food product 70 and may also allow for cleaning of the conveyor system 2 after a production run.

The thermal conduction unit 74 may be stainless steel and include a first conduction heater 80 and a second conduction heater 82. The first and second conduction heaters 80, 82 may be remote-heated by food-grade fluid that passes through pathways formed by welding gates and patterns inside the heaters 80, 82.

The temperature of the thermal radiation unit 72 and the thermal conduction unit 74 may be independently controlled to produce desired characteristics in the cooked food product 70, which in the case of eggs, may solidify during heating.

The belt 12 is passed across, and rides on top of, the first and second conduction heaters 80, 82. Heat is transferred to the belt 12 through conduction and, consequently, to the food product 70 resting on the top surface 66 of the belt 12 in the receptacles 64.

The food product 70, while being in the receptacles 64 and moved along the feed path, may first move through a first heating zone 84 and then subsequently through a second heating zone 86. In other words, with respect to the first direction F, the first heating zone 84 is before the second heating zone 86. The first heating zone 84 may be hotter (i.e. produce more heat and be at a higher temperature) than the second heating zone 86. The first heating zone 84 may be defined by the first radiation heater 76 and the first conduction heater 80. The second heating zone 86 may be defined by the second radiation heater 78 and the second conduction heater 82. More or less heating zones, units, and heaters may be utilized. The thermal radiation unit 72 heats the food product 70 in the receptacles 64 from above by thermal radiation, where radiant heat is directed from the thermal radiation unit, radiated through air, and downward onto the top of the food product 70. The thermal conduction unit 74 heats the food product 70 in the receptacles 64 from below by thermal conduction, where heat is transmitted from the thermal conduction unit 74, conducted through the belt 12, and into the bottom of the food product 70 on the upper surface 66 of the belt 12.

In the case of a cooked egg, this should rest (e.g., for approximately 45-60 seconds) after reaching the needed core temperature in order to create a homogeneous runny yolk. The heating system may therefore include an insulated hood to retain heat and to allow equilibration of temperature throughout the food product 70. This hood, or tempering chamber, may produce the needed internal temperature to satisfactorily cook the food product 70, for example to reach a critical temperature needed to produce a desired yolk consistency for a sunny side up egg.

Figure 8:
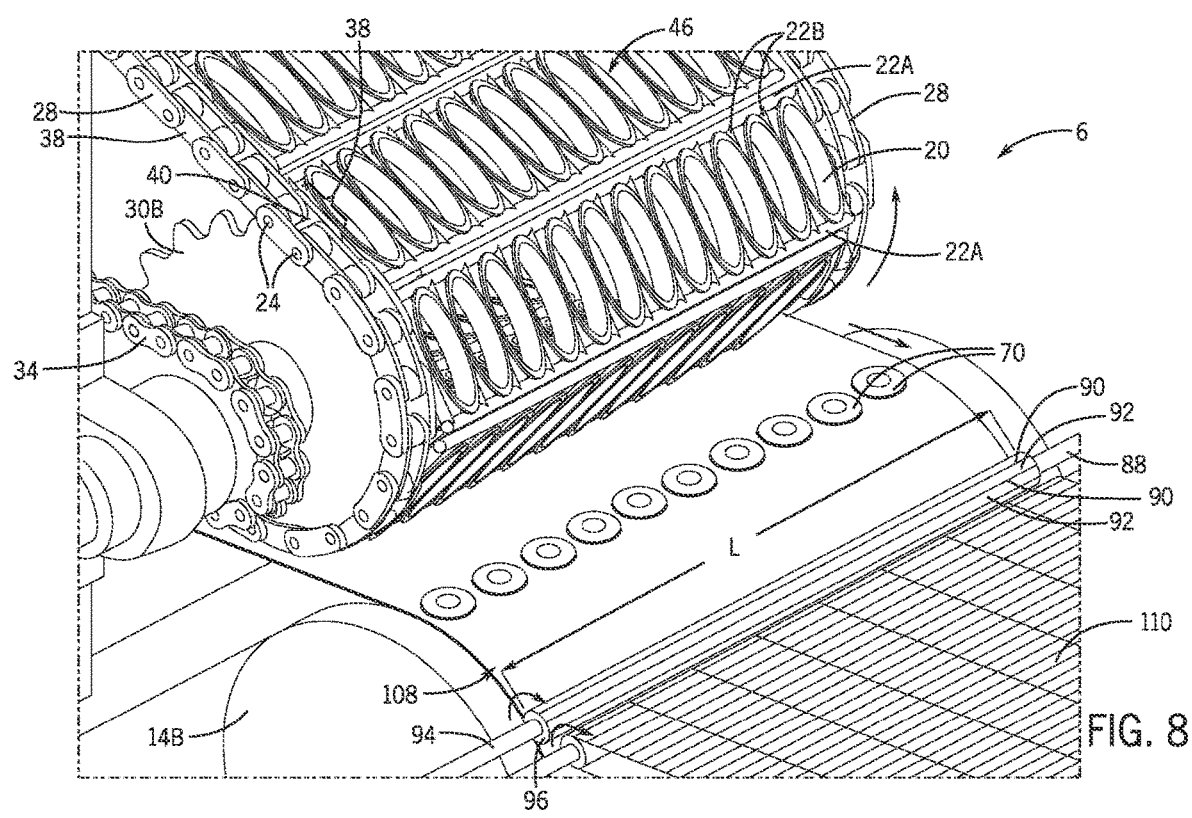
FIG. 8 is a perspective view showing a discharge end of a conveyor system in accordance with the present subject matter.

After cooking, the conveyor system 2 is configured such that the lower conveyor 8 and the upper conveyor 10 are moved apart at the discharge end 6 so that the molds 20 no longer contact the belt 12 (FIG. 8). This separation of the lower and upper conveyors 8, 10 occurs after the food product 70 in the receptacles 64 is moved through the heating system, and in the case of an egg, after the egg is cooked enough to be stable. Removal of the molds 20 leave the eggs in a semi-gelatinous state resting on the PTFE conveyor belt 12, where the residual heat finishes the cooking process. Although the egg is fully cooked by temperature, the yolk is still liquid and the egg white is flexible.

More particularly, the drive chains 28 are deflected up away from the belt 12 by being guided around the discharge end drive roller 30B at the discharge end 6, which pulls the frames 16 and molds 20 away from the belt 12 such that the molds 20 no longer contact the belt 12, and thus leave the heated food product 70 (also referred to herein as "formed product" or "cooked food product") on the belt 12 (FIG. 8).

The cooked food product 70 is then further transferred on the surface 66 of the belt 12 in the first direction F.

4. Transfer Roller.

The conveyor system 2 may further include a transfer roller 88. In the case of eggs as the food product 70, removing these from the belt 12 after cooking is problematic and conventional transfer methods do not provide satisfactory results. This is because surface tension created by the moisture in the egg, as well as the texture and flexibility of the egg, causes the egg to adhere to the surface 66 of the belt 12. Because of this problem, the transfer roller 88 has been configured to easily remove the heated food product 70 from the discharge end 6 of the belt 12. The transfer roller 88 includes an outer surface with a series of alternating ridges 90 and grooves 92 that extend along a length L of the transfer roller 88. The transfer roller 88 may include a central rod or roller 94, e.g. a round metal rod or bar (e.g. stainless steel) having a diameter of ½" to 1", or ⅝", with an outer sleeve or sheath 96 surrounding the central roller 94. The outer sleeve 96 may comprise a pliable yet resilient polymer, e.g. molded silicone rubber, and the ridges 90 may extend up from the grooves 92 by ¹⁄₁₆" to ¼", or ⅛". The transfer roller may rotate at a speed as selected by a user, and in a direction as indicated by the arrow in FIG. 9. The transfer roller 88 is arranged at a discharge end 6 of the belt 12, and is configured to remove and transfer the heated food product 70 off of the belt 12. The transfer roller 88 may be arranged at a downward sloped portion 108 of the belt 12 as shown in FIGS. 8-11 and which is created as the belt 12 deflects around the discharge end roller 14B. The rotational axis of the transfer roller 88 may be located below (e.g. 2" below) a horizontal plane defined by the top surface 66 of the belt 12 when in the feed path. This arrangement allows the cooked food product 70 to "drop" or be angled with respect to the direction of gravity and to the transfer roller 88, and thus enables the cooked food product 70 to be lifted and conveyed across the top of the transfer roller 88 to the next conveyor.

The ridges 90 on the transfer roller 88 function to lift the cooked food product 70 from the belt 12 surface 66 while maintaining minimal contact with the food product 70. The rotational speed of the transfer roller 88 is adjustable according to the rotational speed to the belt 12. The rotational speed of the transfer roller 88 may be controlled independently from that of the belt 12 so as to allow fine adjustment of the transfer of the food product 70 and inhibit damage to the cooked food product 70. The silicone rubber of the outer sleeve 96 may meet food contact requirements and may be formulated to minimize damage to the cooked food product 70.

5. Discharge Conveyor.

The conveyor system 2 may further include a discharge conveyor 110, which is configured to accept the heated food product 70 from the transfer roller 88 and to move the heated food product 70 along a distance, e.g. away from the belt 12 and transfer roller 88. During this movement, the heated food product 70 may be cooled, either actively or passively. The discharge conveyor 110 is arranged on a side of the transfer roller 88 opposite from the belt 12, and may comprise an open wire mesh conveyor belt that allows air flow through it for cooling the heated food product 70.

6. Active Cooling Mechanism.

The conveyor system 2 may further include an active cooling mechanism 98 through which the heated food product 70 is transferred by the discharge conveyor 110. The active cooling mechanism 98 may cool the food product 70 down to a temperature where it is easily handled by hand and/or is frozen. This cooling may facilitate packaging of the frozen food product 70 for storage or shipment.

7. Washing System.

The conveyor system 2 may further include a washing system for washing the lower conveyor 8 and/or the upper conveyor 10 before they are moved in return paths of the first and second curved paths, along a second direction S to the feed end 4 of the conveyor system 2. The washing system may include a lower washer 100 configured to wash the belt 12 by removing food product pieces, oils, or other deposits that may have been left on the surface 66 of the belt 12 after the food product 70 has been removed from the belt 12 by the transfer roller 88. The lower washer may utilize air, water (e.g. high pressure water nozzles), detergent, heat, light or other cleaning methods to clean the belt 12 of these deposits. The lower washer 100 may be arranged along a lower return path of the first curved path, and below the feed path.

The washing system may also or alternatively include an upper washer 102 configured to wash the frames 16 and molds 20 by removing food product pieces, oils, or other deposits that may have been left on the frames 16 and molds 20 after the frames 16 and molds 20 have been moved away from the belt 12 and the cooked food product 70 thereon. The upper washer 102 may utilize air, water (e.g. high pressure water nozzles), detergent, heat, light or other cleaning methods to clean the frames 16 and molds 20 of these deposits. The upper washer 102 may be arranged along an upper return path of the second curved path, and above the feed path.

The washing system may include, for example, high-pressure nozzles installed in an enclosed space. This enclosed space (box) has slotted openings large enough for the molds 20 to pass into and out of the box. After the molds 20 enter the box, high pressure nozzles shoot water at a high velocity at the molds 20 to remove residue and oil present on the molds 20. The residue is then discharged through a pipe to plant waste-water systems. Following the wash step, the molds 20 may be dried by low-pressure, high-volume air knives positioned to remove residual moisture attached to the molds 20. The molds 20 are then returned to the feed end 4 where a series of parallel, speed-matched sprockets 30A return the molds 20 (by way of the frames 16) to a position to be placed on top of the belt 12 and loaded again with food product 70.

8. Loading Area.

The conveyor system 2 may further include a loading area 104 in which the food product 70 can be loaded into the receptacles 64. With respect to the first direction F, the loading area 104 may be arranged after of the rollers 14A, 30A at the feed end 4 and before the first heating zone 84. Loading of the food product 70 into the receptacles 64 may be automated, or performed manually.

9. Preheating Zone.

The conveyor system 2 may be configured to preheat the molds 20 before the food product 70 is loaded into the receptacles 64. For this purpose, the conveyor system 2 may further include a preheating zone arranged near the feed end 4 of the conveyor system 2. The preheating zone may be arranged, with respect to the second direction S, before the feed end roller 30A at the feed end 4. The preheating zone may be defined by a preheating unit(s) 106, which may include one or more radiant heaters or convection heaters arranged on opposite sides of the frames 16 and molds 20 and heated by a thermal fluid. The preheating unit(s) 106 may be operated at the same temperature as the heating system and may be supplied with the same thermal fluid flow.

Preheating the molds 20 causes the molds 20 to have a higher temperature when they form the receptacles 64 with the belt 12 and when the food product 70 is arranged therein. When the food product 70, e.g. a liquid or semi-liquid food product such as raw eggs, is arranged in the receptacles, the preheated molds 20 sear edges of the food product 70 that is in contact with the molds to cook and solidify almost immediately, and even before the food product 70 is transported through the heating system. This process of heating the contacting portion of the food product creates an initially cooked portion near the contact between the molds 20 and the belt 12, and this cooked portion is solid and forms a dam that inhibits the remainder of the liquid food product from escaping out of the receptacles 64 between the molds 20 and the upper surface 66 of the belt 12.

10. System Operation.

The heating system may produce an even and slow heating of the food product 70, e.g. an egg, which causes a chemical reaction in the egg white and yolk and produces a rubbery egg white and a contained, liquid yolk. A higher temperature in the first heating zone 84 and a lower temperature in the second heating zone 86 allows equilibration of the temperature of the eggs and results in a cooked sunny side up egg.

The conveyor system 2 may be run in a continuous operation in an industrial production setting to heat/cook the food product 70. The conveyor system 2 utilizes molds 20 in the upper conveyor 10 and replaces traditional belting used in prior industrial grill devices. These molds 20 can be fabricated to create the desired shape and size of the cooked food product 70, where the molds 20 define final outer shape of cooked food product 70. The conveyor system 2 according to the invention can be used to manufacture sunny side up eggs, quiche, and omelet products, and other egg-based or non-egg-based food products.

Figure 9:
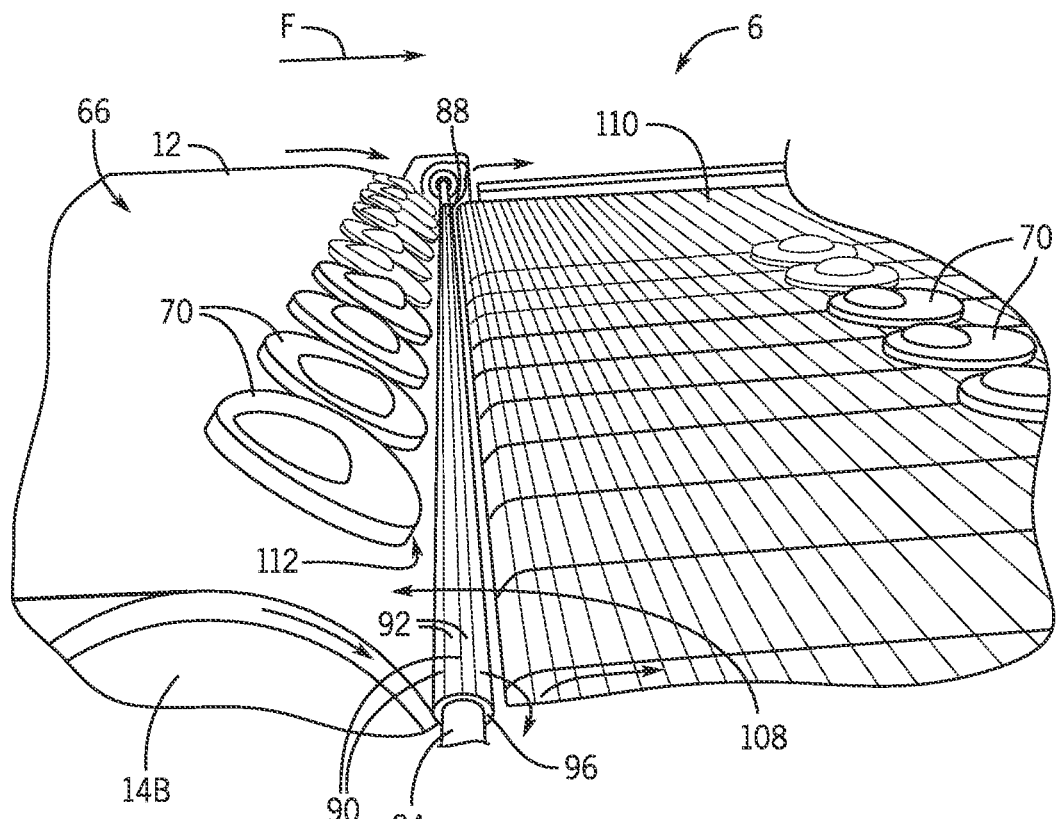
FIG. 9 is a side perspective view showing a transfer operation of a conveyor system in accordance with the present subject matter.
Figure 10:
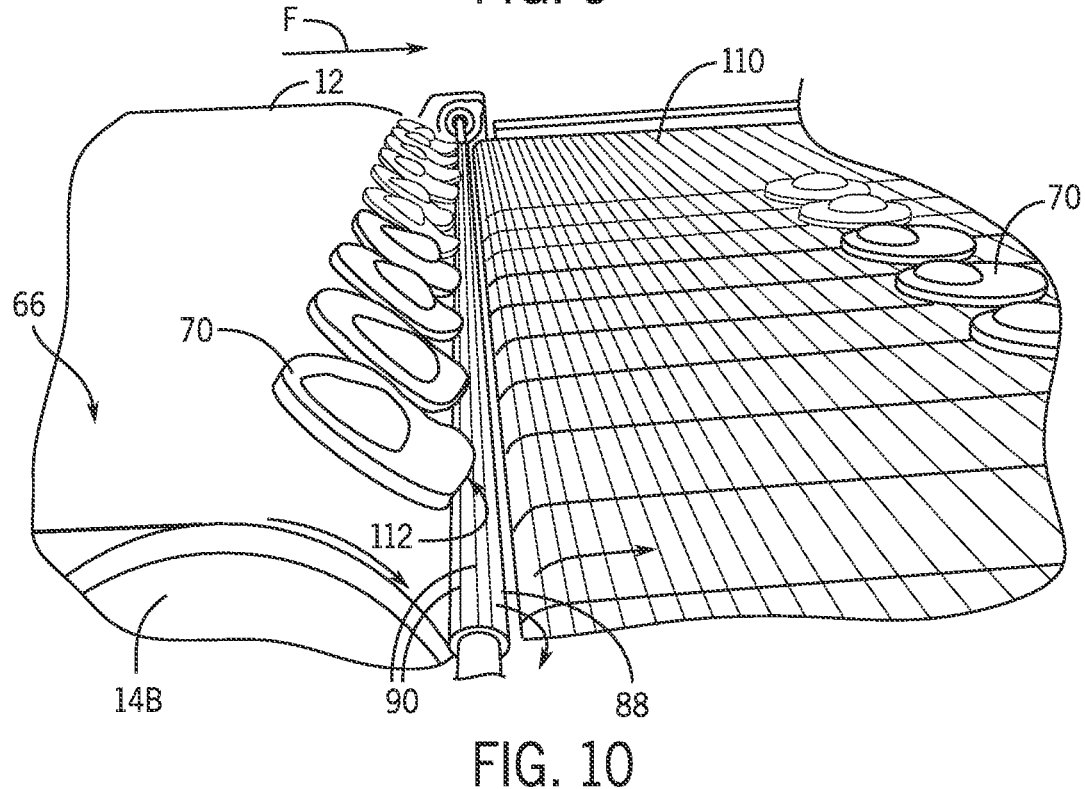
FIG. 10 is a side perspective view showing the transfer operation of FIG. 9 at a later time than shown in FIG. 9.
Figure 11:
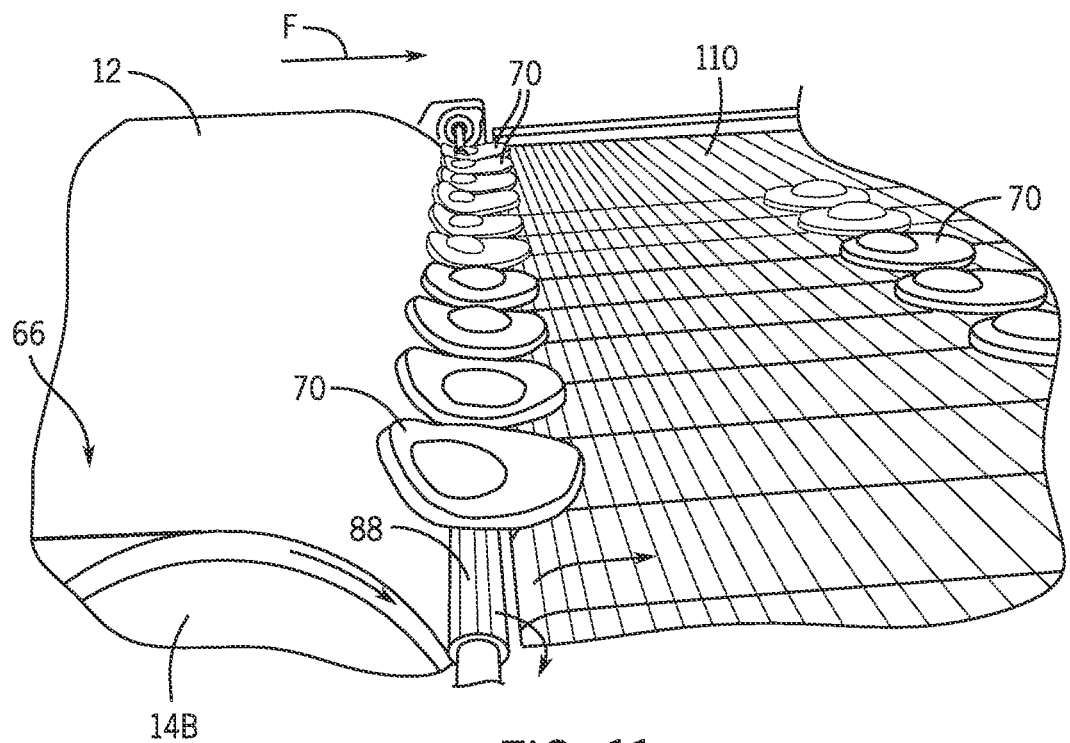
FIG. 11 is a side perspective view showing the transfer operation of FIG. 10 at a later time than shown in FIG. 10.
Figure 12:
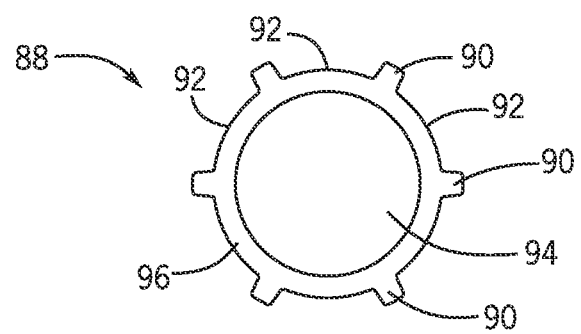
FIG. 12 is a cross-section view of a transfer roller in accordance with the present subject matter.

With reference to FIGS. 9-11 showing a transfer operation of the conveyor system 2, and with respect to sunny side up eggs being the cooked food product 70, depicted are cooked eggs 70 descending the downward sloped portion 108 of the belt 12 around the large diameter discharge end roller 14B. As such, the cooked eggs 70 are sloped at a downward angle rather than being horizontal. The eggs 70 being in this downward sloped orientation allows a leading edge 112 of the eggs 70 to be exposed and facing the transfer roller 88 (FIG. 9). As the eggs 70 are moved further down the downward sloped portion 108, the leading edge 112 of the eggs 70 engage the ridges 90 on the transfer roller 88. The rotating ridges 90 gently engage and lift the front edge 112 of the eggs 70 off of the surface 66 of the belt 12 (FIG. 10). Continued movement of the eggs 70 further down the downward sloped portion 108 and lifting of the eggs 70 by the transfer roller 88 result in guiding of the eggs 70 off the belt 12, up and over the transfer roller 88, on onto the discharge conveyor 110 (FIG. 11) to be conveyed further by the discharge conveyor 110, e.g. to the active cooling mechanism 98.

The system is modifiable in a number of ways to adapt to other products. For example the shape and size of the molds 20 can be changed, the style and material of the belt 12 can be changed, the process of heating the food product 70 can be changed, and the drive of the lower and/or upper conveyors 8, 10 can be modified to fit other requirements.

11. Methods.

The conveyor system 2 may be used in a method of preparing a cooked food product 70. The method may include providing the conveyor system 2, and moving the frames 16 such that the open bottom 46 of each of the molds 20 contacts the belt 12 to thereby form a plurality of receptacles 64.

The food product 70, e.g. raw eggs, is then arranged in the receptacles 64. This may be accomplished by hand, or via an automated method. The food product 70 may fill the receptacles 64 so as to contact the inner surface 68 of the molds 20. The molds 20 may be preheated before the food product 70 is arranged in the receptacles 64, and thus a portion of the food product 70 in contact with the molds 20 may be seared.

The receptacles 64 and food product 70 are then moved in the feed path to the heating system. The heating system heats (i.e. cooks) the food product 70 while in the receptacles 64, which receptacles provide a shape to the food product 70 during cooking. The food product 70 may include a plurality of raw eggs, the cooked food product 70 may include a plurality of cooked eggs, one of the plurality of raw eggs may be arranged in each of the receptacles 64, and each of the molds 20 may provide a shape to one of the cooked eggs.

Cooking may include heating the food product 70 from above with thermal radiation, and heating the food product 70 from below using thermal conduction. Cooking may include moving the food product 70 in the receptacles 64 through the first heating zone 84 and then through the second heating zone 86 of the heating system, where the first heating zone 84 has a higher temperature than the second heating zone 86.

After cooking, the frames 16 are moved such that the molds 20 no longer contact the belt 12. The frames 16 may be lifted up away from the belt 12, which continues to move in a horizontal direction, thereby leaving the cooked food product 70 on the belt 12. The cooked food product 70 is them transferred off of the belt 12 using the transfer roller 88.

The cooked food product 70 may be transferred onto the discharge conveyor 110 using the transfer roller 88, and actively or passively cooled on the discharge conveyor 110, e.g. by using the active cooling mechanism 98. The cooked food product 70 may be subject to other processes, before or after cooling, in order to further modify the food product 70, and these may include for example, further heating (e.g. by radiation or heated air), addition of coloring, drying, etc. A further heating step may include using radiant heaters arranged above the discharge conveyor to fully cook the food product, such as having a completely cooked food product that is entirely solid as opposed to having a sunny side up egg with a liquid yolk.

The belt 12 and/or the molds 20 may be washed after the cooked food product 70 is transferred off of the belt 12.

The foregoing and other features of the invention set forth in detail certain illustrative embodiments of the invention, these being indicative, however, of but a few of the various ways in which the principles of the present invention may be employed.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of cooking a food product using a conveyor system that includes a
   (1) a feed end,
   (2) a discharge end,
   (3) a lower conveyor including an endless belt having an upper surface,
   (4) an upper conveyor including a rotatable ring assembly including
      (a) at least one frame including a plurality of openings, and
      (b) a plurality of molds, each of the plurality of molds being moveably held within one of the plurality of openings in the at least one frame and including an open bottom, and
   (5) a heating system,
the method comprising steps of:
   rotating the endless belt such that the upper surface thereof moves from the feed end toward the discharge end of the conveyor system;
   rotating the ring assembly such that the open bottom of each of the plurality of molds movably held within the at least one frame contacts the upper surface of the endless belt at the feed end of the conveyor system to thereby form a plurality of receptacles, the endless belt and the plurality of molds in contact with the upper surface of the endless belt moving at the same speed;
   arranging the food product on the upper surface of the belt in the plurality of receptacles at the feed end of the conveyor system while the endless belt is rotating;
   cooking the food product in the plurality of receptacles on the upper surface of the endless belt as the upper surface of the endless belt is moving toward the discharge end using heat from the heating system to form a cooked food product; and
   moving the frame away from the endless belt after the cooking step such that the plurality of molds no longer contact the upper surface of the endless belt, thereby leaving the cooked food product on the upper surface of the rotating endless belt.

2. The method according to claim 1, wherein:
   the food product includes a plurality of raw eggs;
   the cooked food product includes a plurality of cooked eggs;
   the arranging step comprises arranging one of the plurality of raw eggs in each of the receptacles; and
   each of the molds provide a shape to one of the plurality of cooked eggs.

3. The method according to claim 1, wherein:
   the cooking step includes heating the food product from above with thermal radiation, and heating the food product from below using thermal conduction; and
   the cooking step includes moving the food product in the receptacles through a first heating zone and then through a second heating zone of the heating system, the first heating zone having a higher heating temperature than the second heating zone.

4. The method according to claim 1, wherein:
   the conveyor system further includes a transfer roller arranged on a downward sloped portion of the endless belt, the transfer roller including a series of alternating ridges and grooves extending along a length of the transfer roller; and
   the method further includes transferring the cooked food product off of the endless belt using the transfer roller.

5. The method according to claim 4, wherein:
   the conveyor system further includes a discharge conveyor and an active cooling mechanism; and
   the method further includes transferring the cooked food product onto the discharge conveyor using the transfer roller, and actively cooling the cooked food product on the discharge conveyor using the active cooling mechanism.

6. The method according to claim 1, wherein:
   the conveyor system further includes a washing system; and
   the method further includes washing the endless belt and the plurality of molds.

7. The method according to claim 2, wherein:
   the frame includes a network of bars defining the openings;
   the network of bars defining the openings comprises lateral bars and longitudinal bars;
   each of the openings is defined by two of the lateral bars and two of the longitudinal bars;
   each of the molds comprises a ring including the open bottom, an endless round vertical side wall, an open top, a top flange, and a bottom flange, the top flange and the bottom flange extending radially out from the side wall to thereby define an annular groove around an outside of the ring;
   some of the bars of the network of bars are arranged at least partially within the annular groove to thereby moveably hold the molds within the openings;
   the molds cannot escape from the openings because such escape is prevented by the flanges being larger than the openings;
   the cooking step includes heating the food product from above with thermal radiation, and heating the food product from below using thermal conduction; and
   the cooking step includes moving the food product in the receptacles through a first heating zone and then through a second heating zone of the heating system, the first heating zone having a higher heating temperature than the second heating zone.

8. The method according to claim 1, wherein the frame is mounted on a continuous drive chain including link pins and link plates, and during the rotating the ring assembly step the continuous drive train moves the frame along a curved path.

9. The method according to claim 8, wherein:
   the frame includes a plate and two pins;
   the plate is incorporated as one of the link plates in the drive chain; and
   the two pins are incorporated as two of the link pins in the drive chains.

10. The method according to claim 1, further comprising removing the cooked food product from a downward sloped portion of the endless belt using a transfer roller.

11. The method according to claim 10, wherein the transfer roller includes a series of alternating silicone ridges and silicone grooves extending along a length of the transfer roller.

12. The method according to claim 11, wherein the transfer roller includes a central rod surrounded by a silicone outer sleeve including the silicone ridges and silicone grooves.

13. The method according to claim 1, further comprising preheating the molds before the food product is arranged in the receptacles.

14. The method according to claim 13, wherein the preheating is accomplished by heaters arranged on opposite sides of the frame.

* * * * *